United States Patent [19]

Nakamura

[11] Patent Number: 5,215,489
[45] Date of Patent: Jun. 1, 1993

[54] METHOD OF MAKING AN OPTICAL SEMICONDUCTOR ELEMENT MODULE

[75] Inventor: Takeshi Nakamura, Kamakura, Japan

[73] Assignee: Mitsubishi Denki Kabushiki Kaisha, Japan

[21] Appl. No.: 861,367

[22] Filed: Mar. 31, 1992

[30] Foreign Application Priority Data

Apr. 9, 1991 [JP] Japan .................................. 3-076386

[51] Int. Cl.⁵ .............................................. G02B 6/42
[52] U.S. Cl. .......................................... 445/4; 385/119
[58] Field of Search .................. 445/3, 4, 64; 385/91, 385/93, 121, 124, 123, 119

[56] References Cited

U.S. PATENT DOCUMENTS

| | | | |
|---|---|---|---|
| 4,314,762 | 2/1982 | Gresko | 385/124 X |
| 4,679,908 | 7/1987 | Goodwin | 385/91 |
| 4,875,752 | 10/1989 | Suzuki | . |
| 5,074,682 | 12/1991 | Uno et al. | 385/93 |
| 5,119,462 | 6/1992 | Matsubara | 385/91 X |
| 5,127,074 | 6/1992 | Watanabe et al. | 385/93 |

FOREIGN PATENT DOCUMENTS 221713 11/1985 Japan .

*Primary Examiner*—Kenneth J. Ramsey
*Attorney, Agent, or Firm*—Wolf, Greenfield & Sacks

[57] ABSTRACT

A method of making an optical semiconductor element module having an optical semiconductor element and a receptacle with which a ferrule of an optical fiber connector can couple by inserting the ferrule into the receptacle, which is of a receptacle type of a construction wherein an optical fiber attached to the ferrule optically couples with the optical semiconductor element comprising steps of: inserting a bundle optical fiber ferrule incorporating a bundle optical fiber having a great numbers of cores, of which first outer diameter is approximately equal to a second outer diameter of the ferrule, into the receptacle; observing light emitted from the optical semiconductor element, or, in case that a lens is incorporated in the optical semiconductor element module, light emitted from the optical semiconductor element and converged by the lens incorporated in the optical semiconductor element module, through the bundle optical fiber; and adjusting a position of the receptacle, or of the optical semiconductor element, or of the lens incorporated in the optical semiconductor element module, so that a first center of light emitted by the optical semiconductor element, or of light converged by the lens in the optical semiconductor element module in case that the lens is incorporated in the optical semiconductor element module, agrees with a second center of the first outer diameter of the bundle optical fiber ferrule.

10 Claims, 13 Drawing Sheets

METHOD OF MAKING AN OPTICAL SEMICONDUCTOR ELEMENT MODULE

This invention relates to a method of making an optical semiconductor element module which incorporates a light emitting semiconductor element such as a light emitting diode or a semiconductor laser utilized in a communication device wherein an optical fiber is used as a transmission path.

FIG. 16 is a diagram showing a method of making a conventional optical semiconductor element module shown, for instance, in Japanese Unexamined Patent Publication No. 118212/1982, wherein a reference numeral 1 designates an optical semiconductor element in which a chip of a semiconductor laser is provided in an airtight package having a glass window, 2, a lens, 31, a receptacle, 32, a cylindrical metallic holder, and 33, an optical semiconductor element holder in which the optical semiconductor element 1 is fixed to a center thereof. The lens 2 is fixed to the receptacle 31 by an adhesive or by a solder. A numeral 41 designates a ferrule, 42, an optical fiber, 43, a connecting nut for fixing the ferrule 41 to the receptacle 31, 101, a receptacle fixing jig to which the receptacle 31 is fixed, 104, a holder fixing jig to which the optical semiconductor element holder 33 is fixed, 121, an optical power meter, and 122, an electric power source for driving the optical semiconductor element 1. An end of the optical fiber 42 is connected to the ferrule 41 by an adhesive or a solder or the like. Furthermore, a sleeve is formed in the receptacle 31 having an inner diameter thereof which is larger than an outer diameter of the ferrule 41 by 1 μm to 10 μm, so that the ferrule 41 can be inserted into the receptacle 31. The optical power meter is connected to the other end of the optical fiber 42.

Next, explanation will be given to a method of making thereof. The ferrule 41 is inserted to the sleeve of the receptacle 31, and the ferrule 41 is fixed to the receptacle 31 by the connecting nut 43. The optical semiconductor element 1 emits light by driving the optical semiconductor 1 by the electric power source 122. When light emitted from the optical semiconductor element 1 is converged by the lens 2 and is totally focused on the optical fiber 42, a display value of the optical power meter 121 is maximized. Therefore, the holder fixing jig 104 is moved in X (X-axis is orthogonal to paper face), Y and Z axes in the diagram in fine adjustment stage, so that the display value of the optical power meter 121 is increased. In this occasion, as a moving order, firstly, the holder fixing jig 104 is moved in X-axis direction at a certain position on Z-axis, by which a position wherein an indicated value of the optical power meter 122 reaches a peak, is sought, and secondly, a position is sought wherein an indicated value of the optical power meter 122 reaches a peak by moving the holder fixing jig 104 in Y-axis direction at the position of peak in X-axis direction. This operation is successively repeated, by which the indicated value of the optical power meter 122 reaches a peak in an X-Y plane. Furthermore, a position wherein the indicated value of the optical power meter 122 reaches a peak in the X-Y plane, is sought by inching it on Z-axis, thereby searching for a position wherein the indicated value of the optical power meter 122 reaches a peak in the directions of X, Y and Z axes.

Accordingly, the best coupling position for the optical fiber 42 and the optical semiconductor element 1 in a three-dimensional space composed by X, Y and Z axes in the diagram, is sought by searching the best coupling position for the optical fiber 42 and the optical semiconductor element 1 in an X-Y plane by alternately and successively scanning along the X and Y axes, and by searching the best coupling position in the X-Y plane along Z-axis direction for a number of times.

Finally, the receptacle 31 and the holder 32 are fixed by welding or the like at the best coupling position for the optical fiber 42 and the optical semiconductor element 1, that is, the position wherein the indicated value of the optical power meter is maximized, and the holder 32 and the optical semiconductor element holder 33 are fixed by welding or the like.

Since the method of making the conventional optical semiconductor element module is composed as above, it is necessary to scan the optical semiconductor element in X, Y and Z axes, particularly in X and Y axes direction for a number of times to search the best coupling position for the optical fiber and the optical semiconductor element. Furthermore, it is necessary to confirm that the indicated value is to be reduced to detect the peak of the indicated value of the optical power meter. Therefore, there is a wasteful motion wherein the optical fiber is moved from a position in which the indicated value is reduced, again to the position of the peak. Therefore it takes time to search the best coupling position.

It is an object of the present invention to solve above problems, wherein the best coupling position for the optical fiber and the optical semiconductor element is sought in a short time and assembling of the optical semiconductor element module is performed in a short time.

According to a first aspect of the present invention, there is provided a method of making an optical semiconductor element module having an optical semiconductor element and a receptacle with which a ferrule of an optical fiber connector can couple by inserting the ferrule into the receptacle, which is of a receptacle type of a construction wherein an optical fiber attached to the ferrule optically couples with the optical semiconductor element comprising steps of: inserting a bundle optical fiber ferrule incorporating a bundle optical fiber having a great numbers of cores, of which first outer diameter is approximately equal to a second outer diameter of the ferrule, into the receptacle; observing light emitted from the optical semiconductor element, or, in case that a lens is incorporated in the optical semiconductor element module, light emitted from the optical semiconductor element and converged by the lens incorporated in the optical semiconductor element module, through the bundle optical fiber; and adjusting a position of the receptacle, or of the optical semiconductor element, or of the lens incorporated in the optical semiconductor element module, so that a first center of light emitted by the optical semiconductor element, or of light converged by the lens in the optical semiconductor element module in case that the lens is incorporated in the optical semiconductor element module, agrees with a second center of the first outer diameter of the bundle optical fiber ferrule.

According to a second aspect of the present invention, there is provided a method of making an optical semiconductor element module having an optical semiconductor element and a receptacle with which a ferrule of an optical fiber connector can couple by inserting the ferrule into the receptacle, which is of a type of a construction wherein an optical fiber attached to the ferrule optically couples with the optical semiconductor element comprising steps of: inserting a bundle optical fiber ferrule with lens incorporating a bundle optical fiber having a great number of cores and a first lens, of which first outer diameter is approximately equal to a second outer diameter of the ferrule, into the receptacle; observing light emitted from the optical semiconductor element, or, in case that a second lens is incorporated in the optical semiconductor element module, light emitted from the optical semiconductor element module and converged by the second lens incorporated in the optical semiconductor element module, through the bundle optical fiber; and adjusting a position of the receptacle, or of the optical semiconductor element, or of the second lens incorporated in the optical semiconductor element, so that a first center of light emitted from the optical semiconductor element, or of light converged by the second lens incorporated in the optical semiconductor element module in case that the second lens is incorporated in the semiconductor element module, agrees with a second center of the first outer diameter of the bundle optical ferrule with lens.

According to a third aspect of the present invention, there is provided a method of making an optical semiconductor element module having an optical semiconductor element and a receptacle with which a ferrule of an optical fiber connector can couple by inserting the ferrule into the receptacle, which is of a type of a construction wherein an optical fiber attached to the ferrule optically couples with the optical semiconductor element comprising steps of: inserting a bundle optical fiber ferrule with mark incorporating a bundle optical fiber having a great number of cores formed with a mark showing a first center of a first outer diameter of the bundle optical fiber at an end portion of the bundle optical fiber, of which second outer diameter is approximately equal to a third outer diameter of the ferrule, into the receptacle; observing light emitted from the optical semiconductor element, or, in case that a lens is incorporated in the optical semiconductor element module, light emitted from the optical semiconductor element module and converged by the lens incorporated in the optical semiconductor element module and the mark, through the bundle optical fiber; and adjusting a position of the receptacle, or of the optical semiconductor element, or of the lens incorporated in the optical semiconductor element module, so that a second center of light emitted from the optical semiconductor element, or of light converged by the lens incorporated in the optical semiconductor element module in case that the lens is incorporated in the semiconductor element module, observed through the bundle optical fiber, agrees with a third center of the mark.

According to a fourth aspect of the present invention, there is provided a method of making an optical semiconductor element module having an optical semiconductor element and a receptacle with which a ferrule of an optical fiber connector can couple by inserting the ferrule into the receptacle, which is of a type of a construction wherein an optical fiber attached to the ferrule optically couples with the optical semiconductor element comprising steps of: inserting a bundle optical fiber ferrule with lens mark formed with a mark showing a first center of a first outer diameter thereof at an end portion thereof, incorporating a bundle optical fiber having a great number of cores and a first lens, of which second outer diameter is approximately equal to a third outer diameter of the ferrule, into the receptacle; observing light transmitted from the optical semiconductor element, or, in case that a second lens is incorporated in the optical semiconductor element module, light emitted from the optical semiconductor element module and converged by the second lens incorporated in the optical semiconductor element module and the mark, through the bundle optical fiber; and adjusting a position of the receptacle, or of the optical semiconductor element, or of the second lens incorporated in the optical semiconductor module, so that a second center of light emitted from the optical semiconductor element, or of light converged by the second lens incorporated in the optical semiconductor element module in case that the second lens is incorporated in the semiconductor element module, observed through the bundle optical fiber, agrees with a third center of the mark.

In the first aspect of the present invention, the center of light emitted from the optical semiconductor element module, or the position of the center of light emitted from the optical semiconductor element and converged by the lens in the optical semiconductor element module can be detected as a two-dimensional image, by observing light emitted by the optical semiconductor element, or, light converged by the lens in the optical semiconductor element module through a bundle optical fiber or the lens and the bundle optical fiber. Furthermore, the position of the center of the ferrule of the optical fiber connector which is inserted and connected to the receptacle of the optical semiconductor element module, can be replaced with the position of the center of the bundle optical fiber. Accordingly, the position of the receptacle and the optical semiconductor element and, in case that there is a lens in the optical semiconductor element module, the position of the lens can be adjusted in a short time, so that the center of light observed through the bundle optical fiber, agrees with the center of the outer diameter of the bundle optical fiber.

Furthermore, in the second aspect of the present invention, the adjusting time can be shortened by detecting the position of the center of light emitted by the optical semiconductor element, or, the position of the center of light emitted by the optical semiconductor element and converged by the lens in the optical semiconductor element module with lens, as a two-dimensional image, and by replacing the position of the center of the ferrule of the optical fiber connector which is inserted and connected to the receptacle of the optical semiconductor element module, with the position of the center of the bundle optical fiber ferrule with lens. Furthermore, the diameter of light emitted by the optical semiconductor element, or the diameter of light emitted by the optical semiconductor element and converged by the lens in the optical semiconductor element module, can be enlarged by the lens in the bundle optical fiber ferrule with lens. Therefore the detection accuracy of the position of light can be promoted.

In the third aspect of the present invention, the adjustment time can be shortened by detecting the position of the center of light emitted by the optical semiconductor element or the position of the center of light emitted by the optical semiconductor element and converged by the lens in the optical semiconductor element module with mark as a two-dimensional image, and by replacing the position of the center of the ferrule of the optical fiber connector which is inserted and connected to the receptacle of the optical semiconductor element module, with the position of the center of the mark detected through the bundle optical fiber. Furthermore, since the center of the mark detected through the bundle optical fiber, and the center of light emitted by the optical semiconductor element, or the center of light emitted from the optical semiconductor element and converged by the lens in the optical semiconductor element module, can simultaneously be observed, the adjustment is facilitated.

In the fourth aspect of the present invention, the adjustment time can be shortened by detecting the center of light emitted from the optical semiconductor element, or the position of light emitted from the optical semiconductor element and converged by the lens in the optical semiconductor element module, as a two-dimensional image, and by replacing the position of the center of the ferrule of optical fiber connecter which is inserted and connected to the receptacle of the optical semiconductor element module with lens mark, with the positon of the center of the mark detected through the bundle optical fiber. Furthermore, the adjustment is facilitated, since the center of the mark detected through the bundle optical fiber, and the center of light emitted from the optical semiconductor element, or the center of light emitted from the optical semiconductor element and converged by the lens in the optical semiconductor element module with lens mark, can simultaneously be observed. Furthermore, the detection accuracy of the position of light can be promoted since the diameter of light emitted from the optical semiconductor element or the diameter of light emitted from the optical semiconductor element and converged by the lens in the optical semiconductor element module with lens mark, can be magnified by the lens of the bundle optical ferrule with lens mark.

Example

EXAMPLE 1

Figure 1:
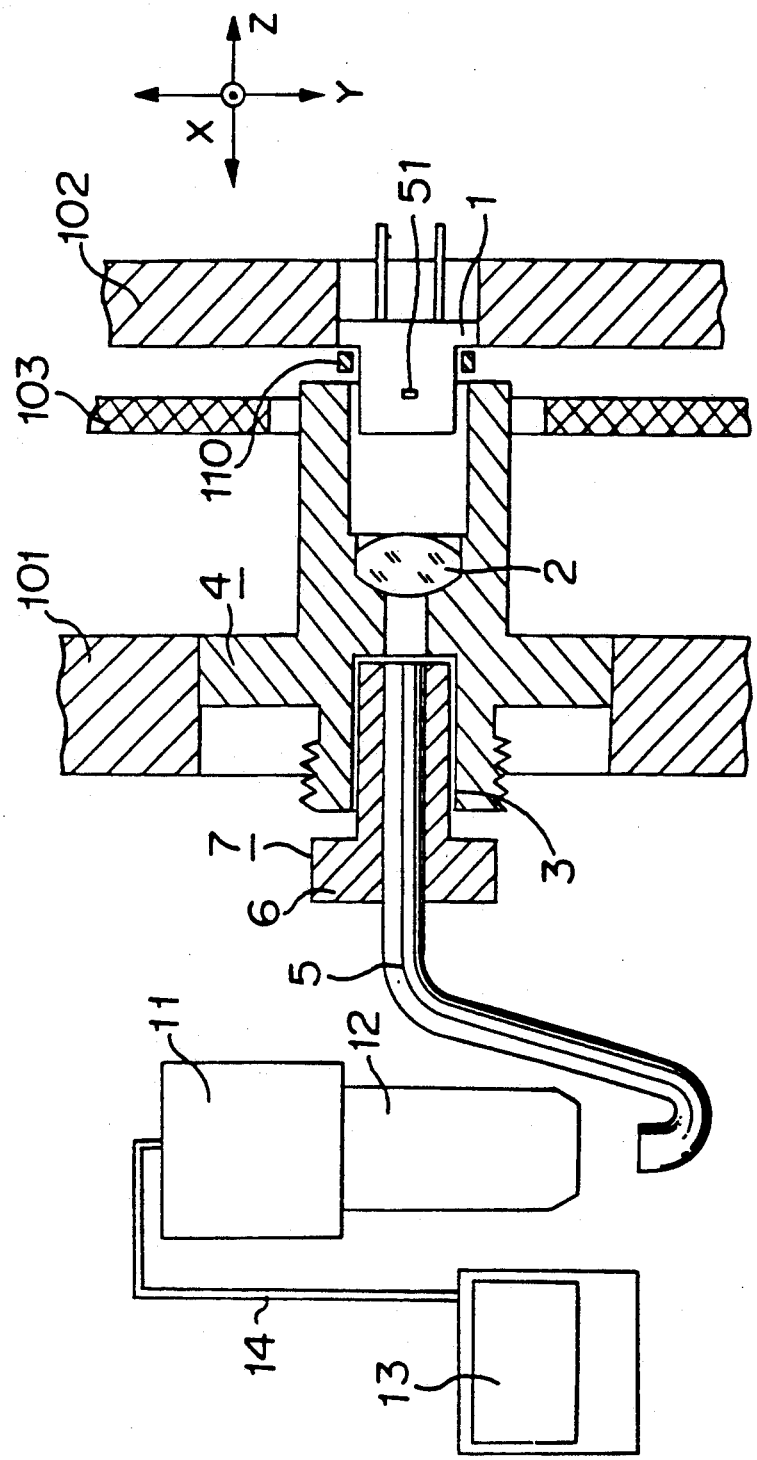
FIG. 1 is a construction diagram showing an embodiment of a method of making an optical semiconductor element module according to the present invention.

Explanation will be given to an embodiment of the present invention referring to the drawings as follows. In FIG. 1, a reference numeral 1 designates an optical semiconductor element wherein a chip such as a light emitting diode or a semiconductor laser is provided in an airtight package having a glass window, 2, a lens and 3, a cylindrical sleeve wherein a ferrule of an optical fiber connector can be inserted. The inner diameter of the sleeve 3 is larger than the outer diameter of the ferrule by 0.5 μm to 10 μm. A reference numeral 4 designates a metallic receptacle wherein a screw for connecting a connecting nut for fixing the ferrule and the sleeve 3 are formed on one side thereof, and the other side thereof is cylindrical, 5, a bundle optical fiber having a great number of cores utilized for an intrabody observing mirror or the like such as a gastro camera or the like, 6, a pipe of which outer diameter at an end portion thereof is smaller than the inner diameter of the sleeve 3 by 0.5 μm to 10 μm, 7, a bundle optical fiber ferrule wherein the bundle optical fiber 5 is fixed in the pipe 6, 12, an optical system such as a microscope, 11, a TV camera, 13, a monitoring television, 14, a coaxial cable for transmitting a signal of the TV camera 11 to the monitoring television 13, 101, a receptacle holding jig to which the receptacle 4 is fixed, 102, an optical semiconductor element fixing jig to which the optical semiconductor element 1 is fixed, 103, a coil for high-frequency heating, and 110, a ring-like solder. A numeral 51 designates a chip such as a light emitting diode or a semiconductor laser incorporated in the optical semiconductor element 1. The lens 2 is fixed to the receptacle 3.

Figure 2:
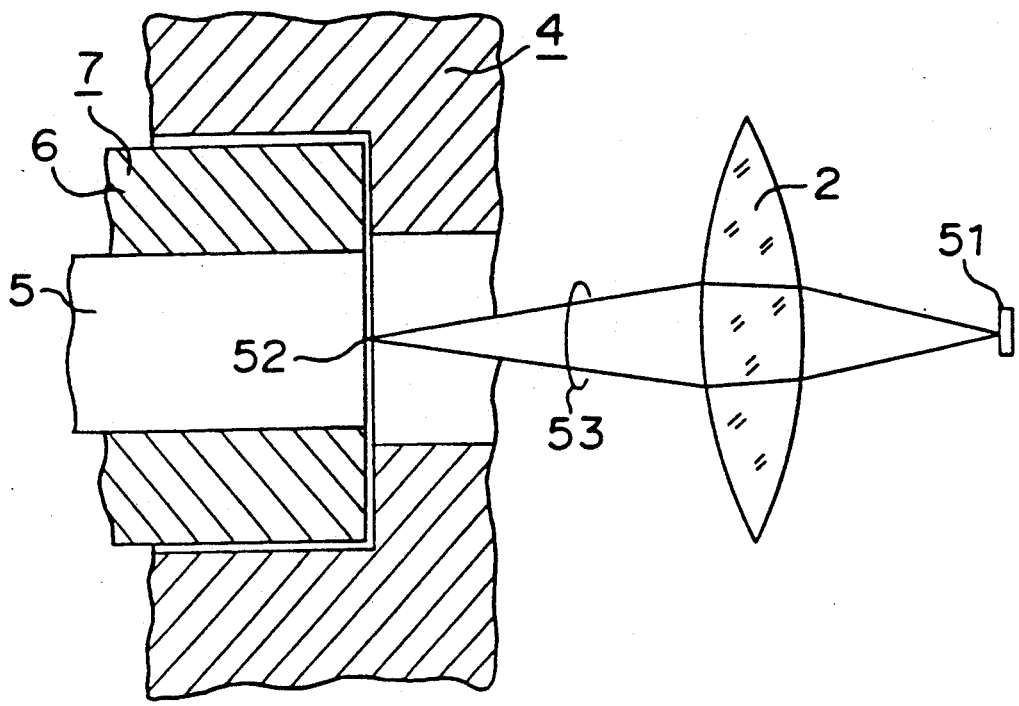
FIG. 2 is a diagram showing an optical path wherein light emitted from a chip of an optical semiconductor element is incident on a bundle optical fiber.

FIG. 2 is a diagram showing an optical path wherein light emitted from the chip of the optical semiconductor element is incident on the bundle optical fiber, and wherein a reference numeral 52 designates light converged by the lens 2, and 53, a line showing an optical path wherein light emitted from the chip 51 incorporated in the optical semiconductor element 1, is converged by the lens 2 and focused to the light 52.

Figure 3:
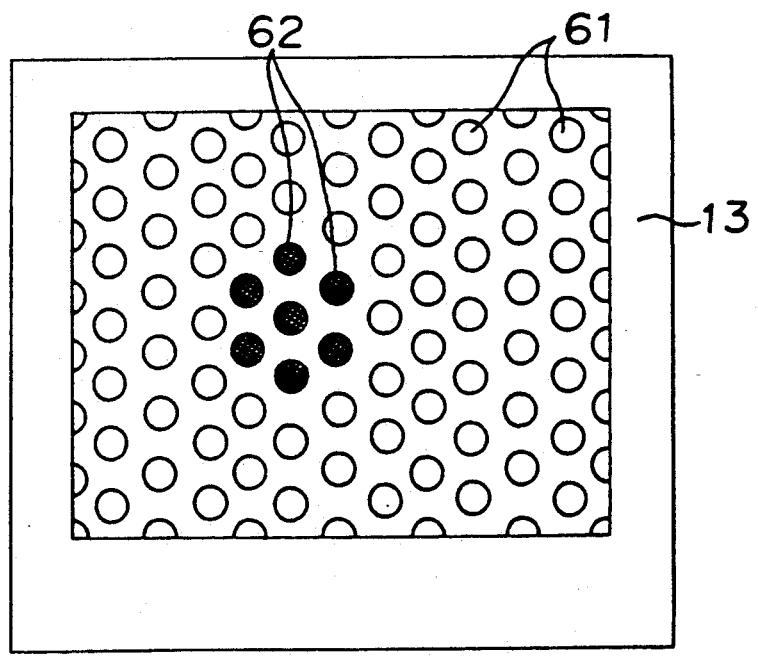
FIG. 3 is a diagram showing an image plane of a monitoring television.

FIG. 3 is a diagram showing an image plane of the monitoring television 13 wherein the light 52 focused by the lens 2 is magnified by the optical system 12 through the bundle optical fiber 5 and taken by the TV camera 11 of its image, wherein a reference numeral 61 designates a great number of cores in the bundle optical fiber 5, and 62, cores wherein the light 52 focused by the lens 2 is transmitted among the cores 61 in the bundle optical fiber 5. The cores 62 are shown in black. In this diagram, only a portion of the cores 61 are denoted by the notation. Furthermore, only a portion of the cores 62 wherein the light 52 focused by the lens 2 is transmitted, is denoted by the notation.

Explanation will be given to a method of making an optical semiconductor element module of this invention as follows. The receptacle 4 is fixed to the receptacle fixing jig 101 and the ring-like solder 110 is provided at the optical semiconductor element 1. The optical semiconductor element 1 is fixed to the optical semiconductor element fixing jig 102. The bundle optical fiber ferrule 7 is inserted into the sleeve 3 of the receptacle 4. The chip 51 in the optical semiconductor element 1 is caused to emit light, and the light 52 focused by the lens 2 is magnified by the optical system 12 through the bundle optical fiber 5, taken of its image by the TV camera 11 and observed by the monitoring television 13.

As shown in FIG. 3, as for the image in the monitoring television 13, a portion thereof looks brightened up by transmitting the light 52 focused by the lens 2, among a great number of cores 61 in the bundle optical fiber 5. When the number of the cores 62 transmitting the light 52 focused by the lens 2, is minimized, the diameter of the light focused by the lens 2 is minimized at an end face of the bundle optical fiber 5. At this occasion, the distance between the receptacle 4 and the optical semiconductor element 1 in Z-axis direction is adjusted by moving the receptacle fixing jig 101 in Z-axis direction so that the number of the cores 62 is minimized.

Next, the receptacle fixing jig 101 is moved in X and Y axes directions, so that a center of a pattern of the cores 62 brightened up by transmitting the light 52 focused by the lens 2 agrees with a center of an outer diameter of the bundle optical fiber ferrule 7, thereby adjusting a positional relationship between the receptacle 4 and the optical semiconductor element 1 in X and Y axes directions.

The center of the pattern of the core or the cores 62 is optically identifiable. However, it can be easily detected by performing a center-of-gravity calculation of the image after performing a dual-values treatment of the image, or by performing a multi values treating of three values or more of the image and a center-of-gravity calculation with respect to the respective elements weighted by a brightness intensity thereof as for ones having values surpassing a value of the portion of the core 61. The center-of-gravity calculation device of these images is generally on sale, whereby the center-of-gravity calculation can be performed in a cycle time of 1 second or less. Furthermore, the center of the outer diameter of the bundle optical fiber module can easily be detected by connecting it with, for instance, another ferrule of an optical fiber connector having the same diameter, by a reference of their outer diameters, and by observing the position of light emitted from the optical fiber connector by a measuring system such as the optical system 12, the TV camera 11, and the monitoring television 13 shown in FIG. 1.

Finally, after the center of the pattern of the cores 62 agrees with the center of the outer diameter of the bundle optical fiber ferrule 7, the ring-like solder 110 is molten by the high-frequency heating flowing electricity in the coil 103, thereby fixing the receptacle 4 and the optical semiconductor element 1.

The positioning accuracy in a deviation between the center of the light 52 focused by the lens 2 and the center of the sleeve 3, can be confined to a range of 10 μm or less even considering an error in replacing the center of the sleeve 3 with the center of the outer diameter of the bundle optical fiber ferrule 7 and a measuring error due to clads which do not transmit light, provided among the cores of the bundle optical fiber 5. Furthermore, since the light 52 focused by the lens 2 is caught through the bundle optical fiber as a two-dimensional image, a distance and a direction of a positional deviation between the center of the light 52 focused by the lens 2 and the center of the outer diameter of the bundle optical fiber ferrule 7 can be detected. Accordingly, time required for adjusting is shortened.

EXAMPLE 2

Figure 4:
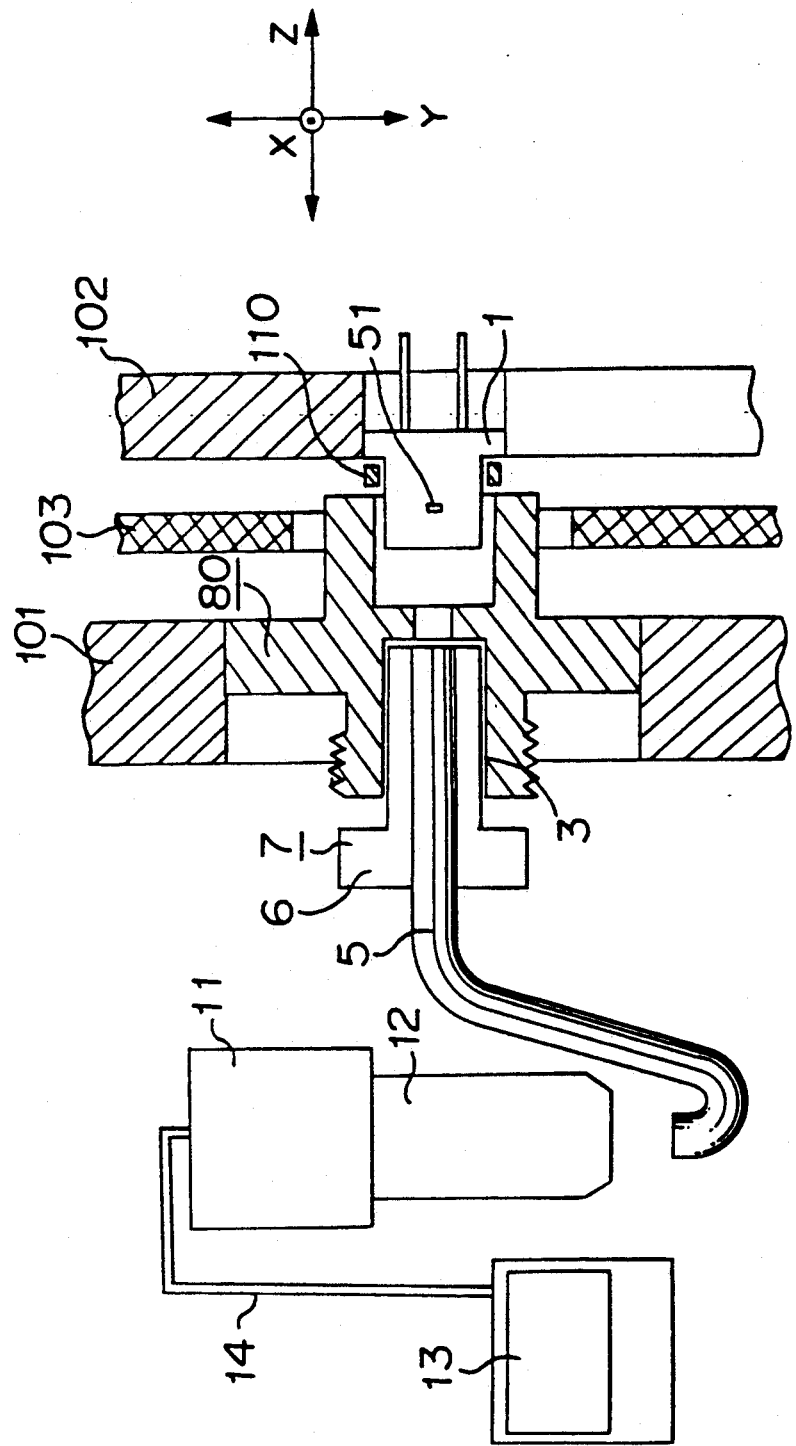
FIG. 4 is a construction diagram showing a second embodiment of a method of making an optical semiconductor element module according to the present invention.

Next, explanation will be given to a second embodiment of the present invention referring to the drawings. FIG. 4 is a diagram for explaining a method of making an optical semiconductor element module according to the present invention, wherein a reference numeral 80 is a metallic receptacle wherein a screw for connecting a connecting nut for fixing the ferrule and the sleeve 3 are formed on one side thereof, and the other side thereof is cylindrical.

Explanation will be given to a method of making the module as follows. After the receptacle 80 is fixed to the receptacle fixing jig 101, and the ring-like solder 110 is provided at the optical semiconductor element 1, the optical semiconductor element 1 is fixed to the optical semiconductor element fixing jig 102. The bundle optical fiber ferrule 7 is inserted into the sleeve 3 of the receptacle 80, and the chip 51 in the optical semiconductor element 1 is caused to emit light. Light emitted from the chip 51 is magnified by the optical system 12 through the bundle optical fiber 5, and taken of its image by the TV camera 11. The receptacle fixing jig is moved in Z-axis direction, and a distance between the receptacle 80 and the optical semiconductor element 1 is adjusted to a predetermined value. After that, the receptacle fixing jig 101 is moved in X and Y axes directions, so that the center of the pattern of the cores in the bundle optical fiber 5 which are brightened up by transmitting light emitted from the chip 51, agrees with a center of an outer diameter of the bundle optical fiber by observing the image plane of the monitoring television 13, thereby adjusting a positional relationship between the receptacle 80 and the optical semiconductor element 1 in X and Y axes directions. Next, the ring-like solder 110 is molten by the high-frequency heating flowing electricity in the coil 103, thereby fixing the receptacle 80 and the optical semiconductor element 1.

In this occasion, light emitted from the light emitting diode or the semiconductor laser, is widened out normally. Accordingly, the diameter of light emitted from the optical semiconductor element 1 on an end face of the bundle optical fiber 5 inserted into the sleeve 3, is large compared with the preceding Example. Accordingly, the number of cores of the bundle optical fiber which are brightened up by transmitting light emitted from the optical semiconductor element 1, is large on the image plane of the monitoring television 13. However, detection of the center of the pattern of the cores of the bundle optical fiber which are brightened up, can be performed accurately by carrying out the center-of-gravity calculation of the image or the like. Accordingly, the positional accuracy in a deviation between the center of light emitted from the optical semiconductor element 1 and the center of the sleeve 3, is almost comparable to the preceding Example. As in the preceding Example since light emitted from the optical semiconductor element 1 is caught as a two-dimensional image, a distance and a direction of the positional deviation between the center of light emitted from the optical semiconductor element 1 and the center of the outer diameter of the bundle optical fiber ferrule 7 can be detected. Accordingly, time required for adjusting is shortened.

EXAMPLE 3

Figure 5:
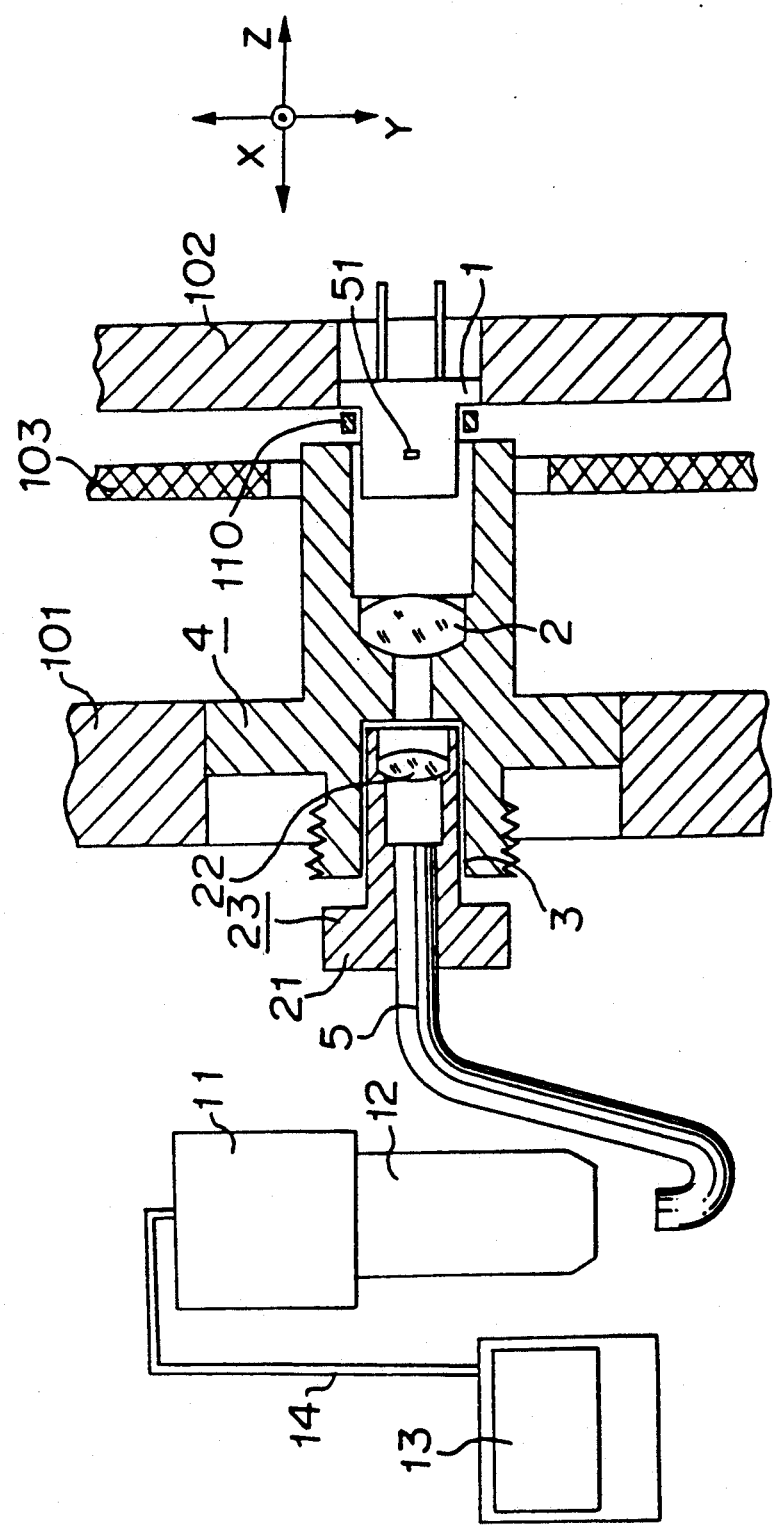
FIG. 5 is a construction diagram showing a third embodiment of a method of making an optical semiconductor element module according to the present invention.

Next, explanation will be given to a third embodiment of the present invention referring to the drawings. FIG. 5 is a diagram for explaining a method of making an optical semiconductor element module of the present invention, wherein a reference numeral 21 designates a pipe of which outer diameter at an end portion thereof is smaller than an inner diameter of sleeve 3 by 0.5 $\mu$m to 10 $\mu$m, 22, a lens which is incorporated in and fixed to the pipe 21, and 23, a bundle optical fiber ferrule with lens wherein the bundle optical fiber 5 and the lens 22 are fixed in the pipe 21. The position of the bundle optical fiber 5 is adjusted so that the diameter of light focused on an end portion of the bundle optical pipe ferrule with lens 23 is magnified by 1 to 10 times and the light is focused again on an end face of the bundle optical fiber 5.

Figure 6:
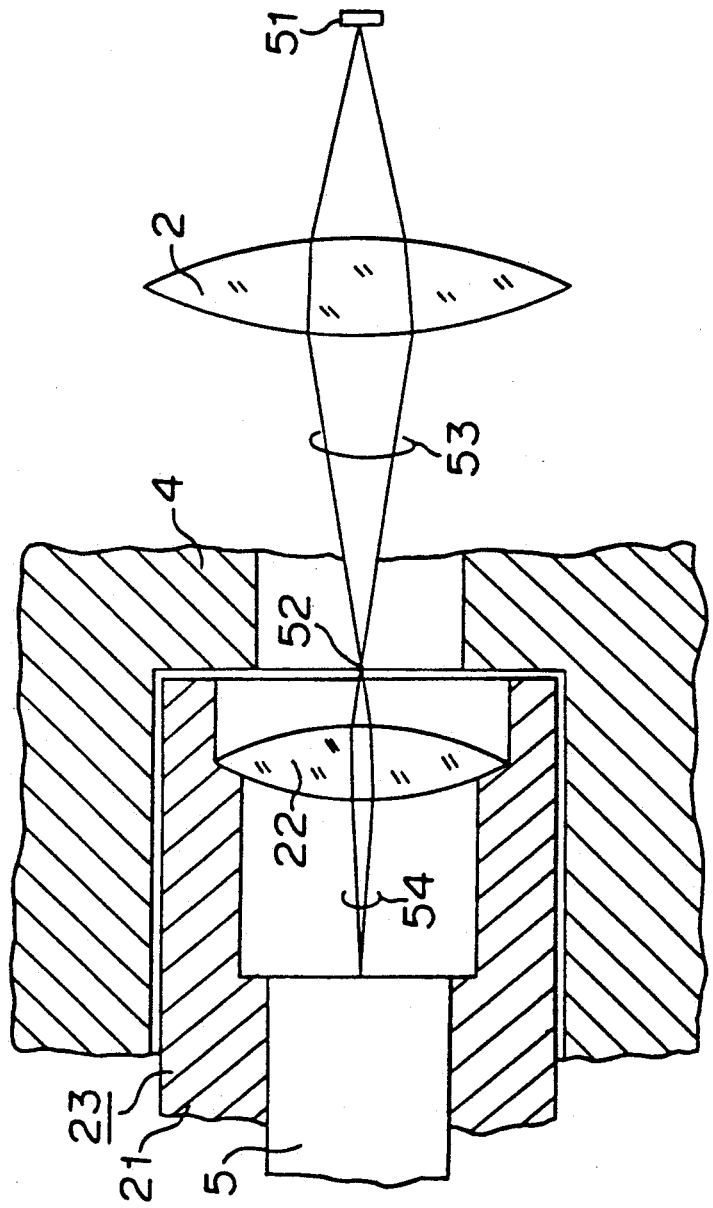
FIG. 6 is a diagram showing an optical path wherein light emitted from a chip of an optical semiconductor element is incident on a bundle optical fiber.

FIG. 6 is a diagram showing an optical path wherein light emitted from the chip of the optical semiconductor element is incident on the bundle optical fiber. A reference numeral 54 designates an optical path wherein the light 52 emitted from the chip 51 and focused by the lens 2 is again converged by the lens 22 in the bundle optical fiber ferrule with lens 23.

Explanation will be given as follows. After the receptacle 4 is fixed to the receptacle fixing jig 101, and the ring-like solder 110 is provided at the optical semiconductor element 1, the optical semiconductor 1 is fixed to the optical semiconductor element fixing jig 102. The bundle optical fiber ferrule with lens 23 is inserted into the sleeve 3 of the receptacle 4. The chip 51 in the optical semiconductor element 1 is caused to emit light and the light 52 converged by the lens 2 is magnified by the bundle optical fiber ferrule with lens 23 by 1 to 10 times and converged again on the end face of the fiber 5. The light converged on an end face of the bundle optical fiber 5 is magnified by the optical system 12 through the bundle optical fiber 5, taken of its image by the TV camera 11, and observed by the monitoring television 13. As in the preceding Example, the receptacle fixing FIG. 101 is moved in Z-axis direction so that the number of cores of the bundle optical fiber 5 transmitting the light focused on the end face of the bundle optical fiber 5 is minimized, and a distance between the receptacle 4 and the optical semiconductor element 1 in Z-axis direction, is adjusted. Next, the receptacle fixing jig 101 is moved in X and Y axes directions, so that a center of a pattern of the cores in the bundle optical fiber 5 transmitting the light converged on the end face of the bundle optical fiber 5 agrees with a center of an outer diameter of the bundle optical fiber ferrule with lens 23, thereby adjusting a positional relationship between the receptacle 4 and the optical semiconductor element 1 in X and Y axes directions. Finally, the ring-like solder 11 is molten by high-frequency heating flowing electricity in the coil 103, thereby fixing the receptacle 4 and the optical semiconductor element 1.

The center of the outer diameter of the bundle optical fiber ferrule with lens, can easily be detected by connecting it with an optical fiber connector of the same diameter in a reference of their outer diameters, and by observing the position of light emitted from the optical fiber connector by a measuring system such as the optical system 12, the TV camera 11 and the monitoring television 13 shown in FIG. 5. Furthermore, a center of a pattern of cores of the bundle optical fiber 5 which transmits the light focused on the end face of the bundle optical fiber 5, can accurately be detected by performing the center-of-gravity calculation of an image or the like as in the preceding Examples.

The positioning accuracy in a deviation between centers of the light 52 focused by the lens 2 and the sleeve 3 can be promoted by magnifying the light 5 focused by the lens 2, by the lens 22 of the bundle optical fiber ferrule with lens 23. For instance, in case that the bundle optical fiber having a core diameter of 10 $\mu$m and an inter-core distance of 14 $\mu$m is utilized and a diameter of the light 52 focused by the lens 2 is 12 $\mu$m, when the position of the light 52 focused by the lens 2 is deviated by $\pm 1$ $\mu$m, the light is incident on only a single core of the bundle optical fiber. Accordingly, the measuring accuracy of the position is $\pm 1$ $\mu$m. By contrast, in case that the light 52 focused by the lens 2 is magnified by 10 times by a lens in the bundle optical fiber ferrule with lens, the diameter of the focused light 52 becomes 120 $\mu$m. Accordingly, the light is not incident only on a single core of the bundle optical fiber, and a detection accuracy of the position becomes $\pm 0.1$ $\mu$m which is 1/10 in case that the light is not magnified by the lens in the magnification of 10. Accordingly, in the positioning accuracy in a deviation between the center of the light 52 focused by the lens 2 and the center of the sleeve 3, an error due to a difference between an outer diameter of the bundle optical fiber ferrule with lens and an inner diameter of the sleeve 3, becomes overwhelming. It is possible to minimize the error to 5 $\mu$m or less in this Example.

Furthermore, as in the preceding Examples, since the light 52 focused by the lens 2 is caught as a two-dimensional image, it becomes possible to detect a distance and a direction of the positional deviation between the center of the light focused by the lens 2 and the center of the outer diameter of the bundle optical fiber ferrule 23, time required for adjustment is shortened.

EXAMPLE 4

Figure 7:
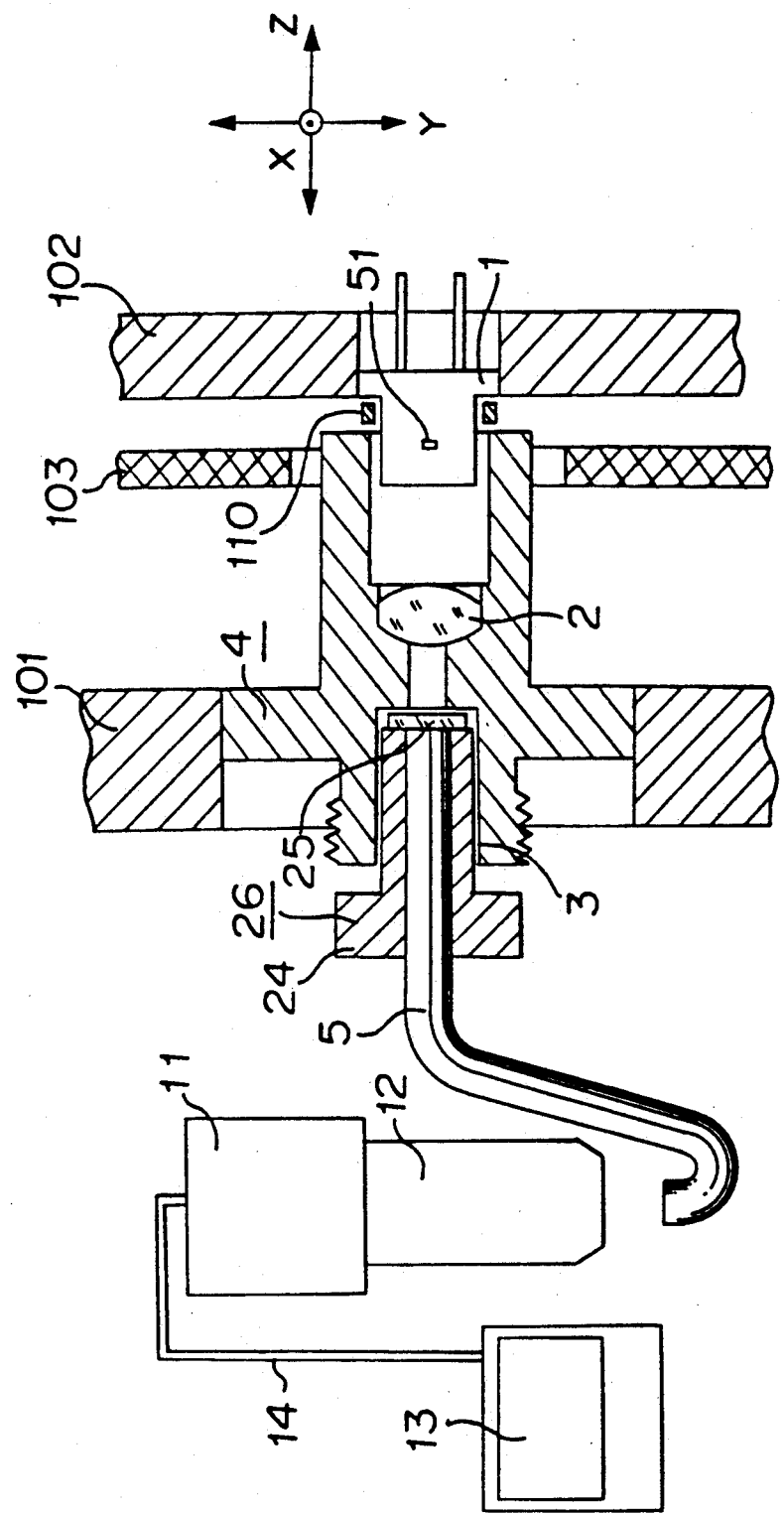
FIG. 7 is a construction diagram showing a fourth embodiment of a method of making an optical semiconductor element module according to the present invention.
Figure 8A:
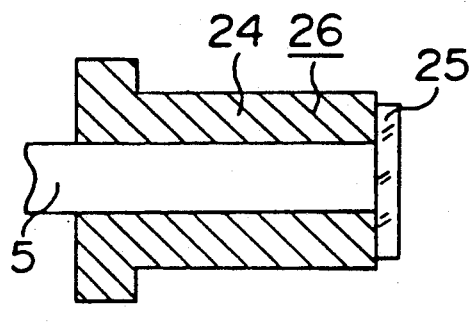
FIGS. 8A and 8B are diagrams for explaining a bundle optical fiber ferrule with mark.
Figure 8B:
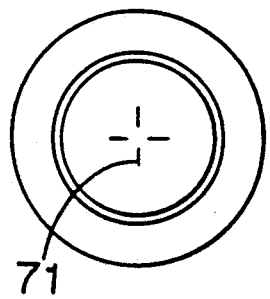

Next, explanation will be given to a fourth embodiment of the present invention referring to the drawings. FIG. 7 is a diagram for explaining an optical semiconductor element module of this invention, and FIGS. 8A and 8B, diagrams for explaining a bundle optical fiber ferrule with mark. In these Figures, a reference numeral 24 designates a pipe having an outer diameter of an end portion thereof smaller than an inner diameter of the sleeve 3 by 0.5 $\mu$m to 10 $\mu$m, 25, a disk-like glass plate having a thickness of 0.5 mm, and 26, a bundle optical fiber ferrule with mark wherein the bundle optical fiber 5 is fixed in the pipe 24 and the glass plates 25 is fixed to an end portion of the pipe 24. A numeral 71 designates a mark showing a center of an outer diameter of the end portion of the bundle optical fiber ferrule with mark 26, formed on a face of the glass plate 25. Although the mark 71 can be formed by etching the glass plate 25 by hydrofluoric acid, it is formed by a film vapor-deposited with a metal such as aluminum by utilizing production technology of a mask of a semiconductor integrated circuit. A line width of the mark 71 is from 2 $\mu$m to 10

μm. Furthermore the mark 71 is formed on a face of the glass plate 25 on the side of the bundle optical fiber 5.

Figure 9:
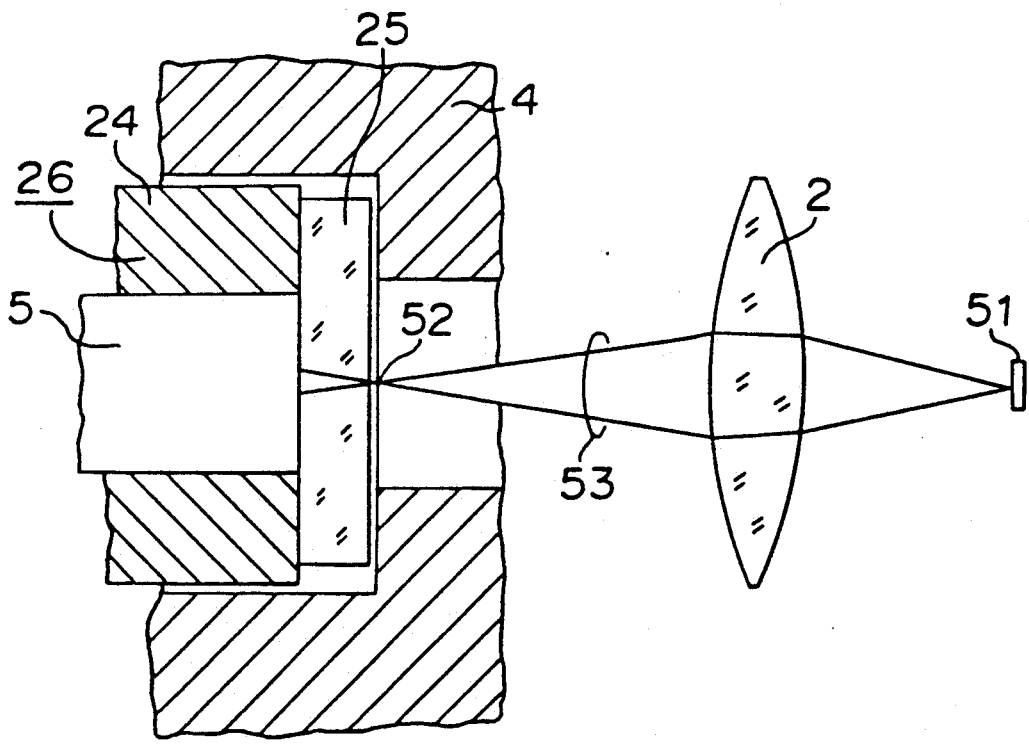
FIG. 9 is a diagram showing an optical path wherein light emitted from a chip of an optical semiconductor element is incident on a bundle optical fiber.
Figure 10:
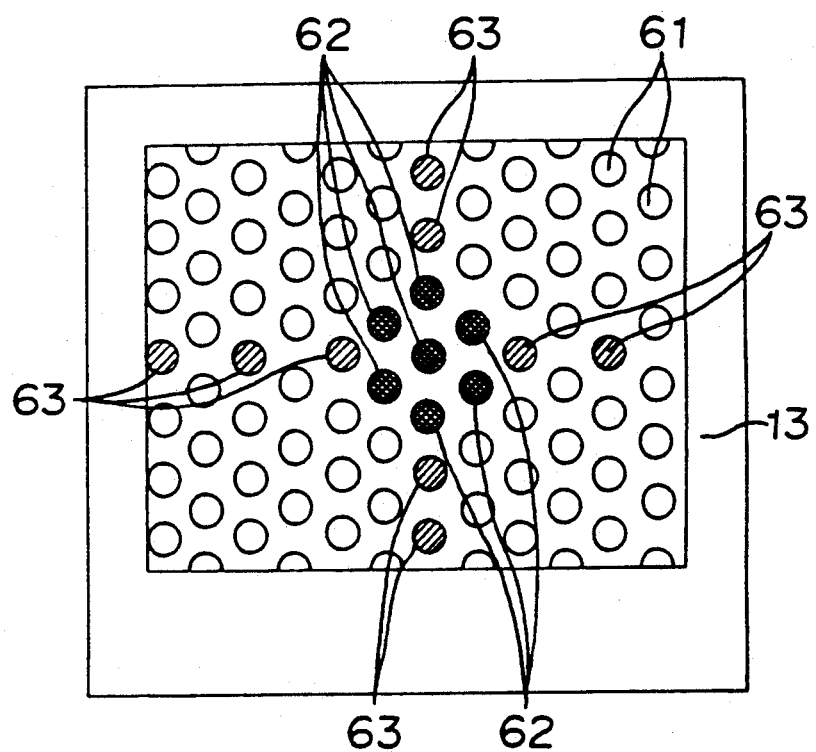
FIG. 10 is a diagram showing an image plane of a monitoring television.

FIG. 9 is a diagram showing an optical path wherein light emitted from a chip of a semiconductor element is incident on the bundle optical fiber, and FIG. 10, a diagram showing an image plane of the monitoring television 13 wherein the light 52 focused by the lens 2 is magnified by the optical system 12 through the bundle optical fiber 5, and is taken of its image by the TV camera 11. A numeral 63 signifies a core of the optical fiber 5 which is brightened up by light reflected by the mark 71 and transmitted through the core of the bundle optical fiber 5. Since a width of the mark 71 is as narrow as 2 μm to 10 μm, the cores 63 form rows of a single core or dual core of the bundle optical fibers 5.

Explanation will be given to a method of making thereof as follows. The receptacle 4 is fixed to the receptacle fixing jig 101, and the ring-like solder 110 is provided at the optical semiconductor element 1, and the optical semiconductor element 1 is fixed to the optical semiconductor element fixing jig 102. The bundle optical fiber ferrule with mark 26 is inserted into the sleeve 3 of the receptacle 4. The light 52 emitted by the chip 51 in the optical semiconductor element 1 and focused by the lens 2 is magnified by the optical system 12 such as a microscope through the bundle optical fiber 5 of the bundle optical fiber ferrule with mark 26, and taken of its image by the TV camera 11. In this occasion, an end face of the bundle optical fiber 5 on the side of the optical system 12 is illuminated by an illuminating device of the optical system 12 such as a microscope. This illuminating light transmits through the cores in the bundle optical fiber 5, reflected by the mark 71, and again transmits through the cores of the bundle optical fiber 5. Accordingly, the cores 63 as in FIG. 10, is displayed on the monitoring television 13 as an image having contrast to the cores 61. Next, a distance between the receptacle 4 and the optical semiconductor element 1 is controlled by moving the receptacle fixing jig 101, so that a number of cores 62 brightened up by transmitting the light 52 focused by the lens 2, becomes a predetermined number. Furthermore, the positional relationship between the receptacle 4 and thus optical semiconductor element 1 in X and Y axes directions, is controlled by moving the receptacle fixing jig 101 in X and Y axes directions, so that a center of a pattern of the core 62 brightened by transmitting the focus light 52, agrees with a center of a pattern of the cores 63 brightened up by light reflected by the mark 71. Finally, the ring-like solder 110 is molten by high-frequency heating flowing electric current in the coil 103, thereby fixing the receptacle 4 to the optical semiconductor element 1.

A center of an inner diameter of the sleeve 3 is replaced with an outer diameter of the bundle optical fiber ferrule with mark 26, and the mark 71 showing the center of the outer diameter is observed through the bundle optical fiber 5. Accordingly, since, in addition to the shortening of the operating time by observing a two-dimensional image in the preceding Examples, a target whereby a center of the pattern of the cores 62 brightened up by transmitting the focused light 52 is adjusted, is always displayed on the monitoring television 13, the operation is facilitated.

EXAMPLE 5

Figure 11:
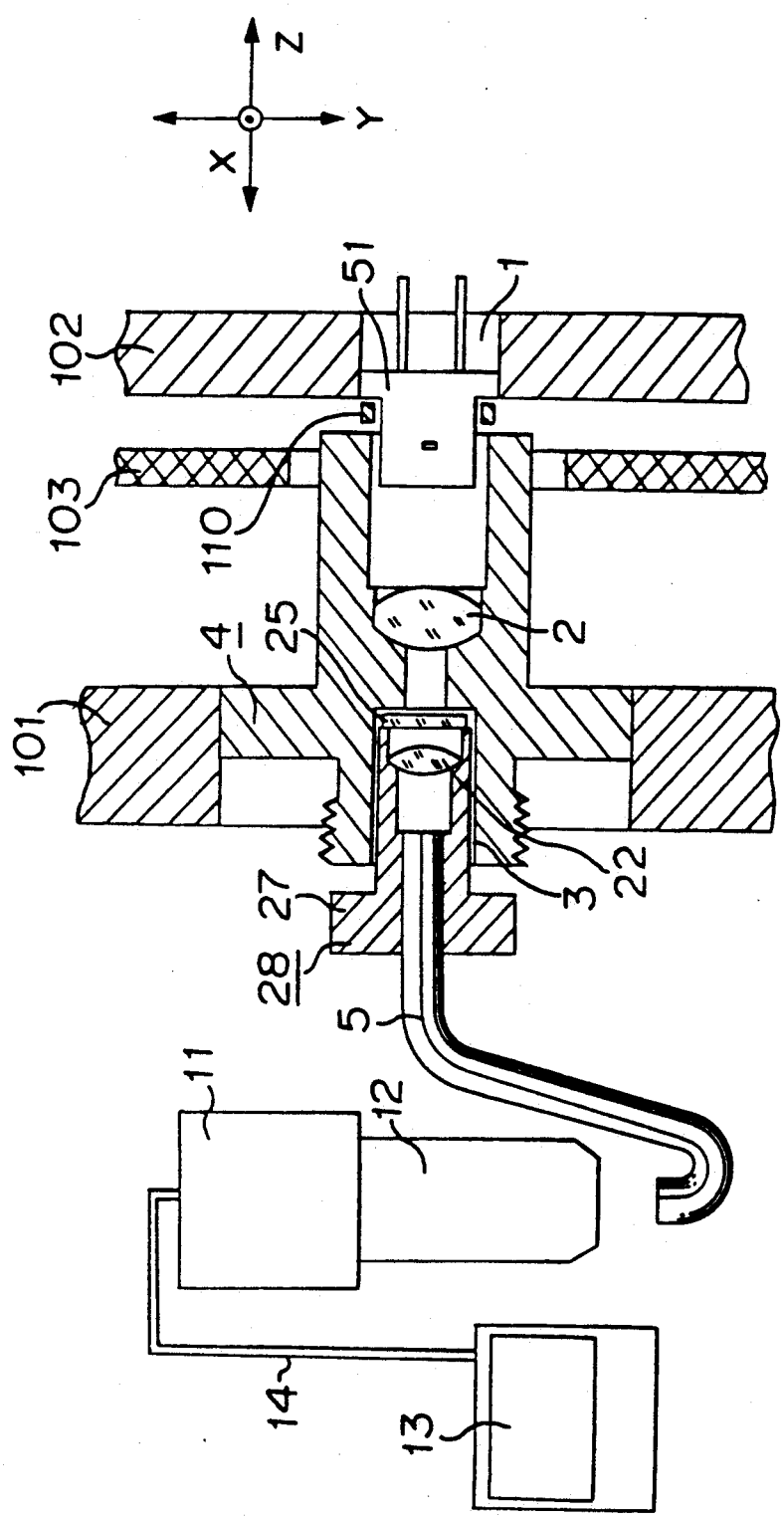
FIG. 11 is a construction diagram showing a fifth embodiment of a method of making an optical semiconductor element module according to the present invention.
Figure 12A:
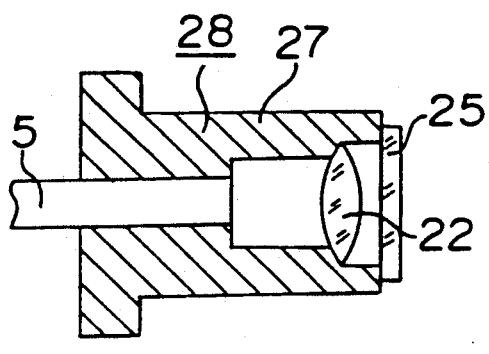
FIGS. 12A and 12B are diagrams for explaining a bundle optical fiber ferrule with lens mark.
Figure 12B:
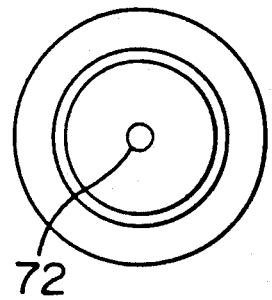

Next, explanation will be given to a fifth embodiment of the present invention referring to the drawings. FIG. 11 is a diagram for explaining an optical semiconductor element module of the present invention, and FIGS. 12A and 12B, diagrams for explaining a bundle optical fiber ferrule with lens mark. In these Figures, a reference numeral 27 designates a pipe having an outer diameter of an end portion thereof smaller than the inner diameter of the sleeve 3 by 0.5 μm to 10 μm, and 28, a bundle optical fiber ferrule with lens mark wherein the bundle optical fiber 5 and the lens 22 are fixed in the pipe 27, and the glass plate 25 is fixed to the end portion of the pipe 27. A numeral 72 designates a circular mark having a line width thereof of 2 μm to 10 μm, which is formed by a film vapor-deposited with aluminum on one face of the glass plate 25. The mark 72 is formed on a face of the glass plate 25 opposite to the side of the lens 22.

Figure 13:
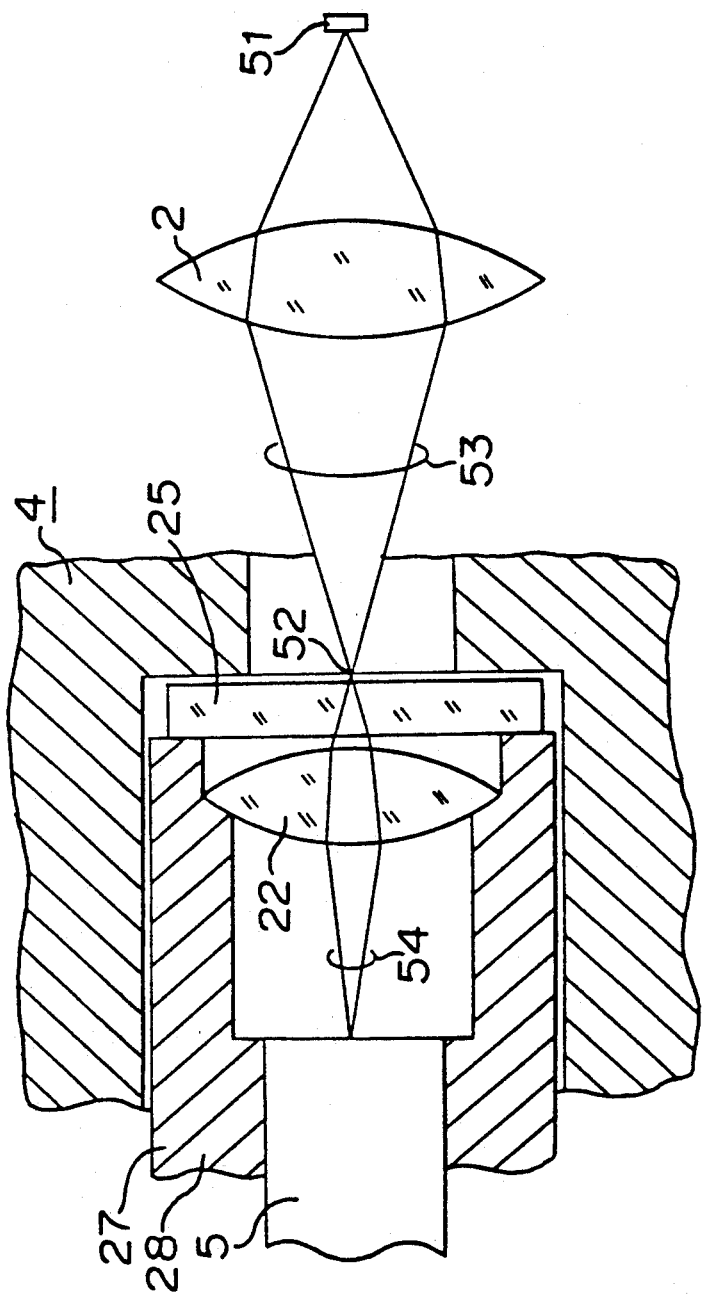
FIG. 13 is a diagram showing an optical path wherein light emitted from a chip of an optical semiconductor element is incident on a bundle optical fiber.

FIG. 13 is a diagram showing an optical path wherein light emitted from a chip of the optical semiconductor element, is incident on the bundle optical fiber. The light 52 focused by the lens 2 is converged on an end face of the bundle optical fiber 5 by the lens 22 after transmitting through the glass plate 25. In this occasion, the positions of the lens 22 and the bundle optical fiber 5 are controlled so that a diameter of the focused light 52 is magnified by 1 to 10 times by the lens 22.

Explanation will be given to a method of making thereof as follows. The receptacle 4 is fixed to the receptacle fixing jig 101, the ring-like solder 110 is provided so that the optical semiconductor element 1 and the optical semiconductor element 1 is fixed to the optical semiconductor element fixing jig 102. The bundle optical fiber ferrule with lens mark 28 is inserted into the sleeve 3 of the receptacle 4. The light 52 emitted from the chip 51 in the optical semiconductor element 1 is focused by the lens 2 is magnified by the optical system 12 such as a microscope through the bundle optical fiber 5 of the bundle optical fiber ferrule with lens mark 28, and is taken of its image by the TV camera 11. At this occasion, an end surface of the optical fiber 5 on the side of the optical system 12 is illuminated by an illuminating device in the optical system 12 such as a microscope. This illuminating light transmits through the cores in the bundle optical fiber 5, illuminates the glass plate 25, and a portion thereof is reflected by the mark 71 formed on the glass plate 25. The light reflected by the mark 72 is focused on an end face of the optical fiber 5 by the lens 22, transmits through the cores of the bundle optical fiber and forms a dot pattern of the cores of the bundle optical fiber which is brightened up in almost a circular shape on the monitoring television 13. Next, a distance between the receptacle 4 and the optical semiconductor element 1 is controlled by moving the receptacle fixing jig 101 so that a number of cores brightened up by transmitting the light 52 focused by the lens 2, is minimized. Furthermore, the positional relationship between the receptacle 4 and the optical semiconductor element 1 in X and Y axes directions is controlled by moving the receptacle fixing jig 101 in X and Y axes directions, so that a center of a pattern of the cores brightened up by transmitting the focused light 52, agrees with a center of the circular dot pattern which is formed by the light reflected by the mark 72 on the monitoring television 13. Finally, the ring-like solder 110 is molten by high-frequency heating flowing current in the coil 103, thereby fixing the receptacle 4 to the optical semiconductor element 1.

As in the preceding Examples, by detecting the position of the light emitted from the optical semiconductor element and focused by the lens in the optical semiconductor element module, and by replacing the position of the light of the ferrule of the optical fiber connector which is inserted and connected to the receptacle of the optical semiconductor element module, with the position of the mark which is detected through the bundle optical fiber, time for adjusting can be shortened. Furthermore, as in the preceding Examples, since the center of the mark detected through the bundle optical fiber and the center of the light emitted from the optical semiconductor element and focused by the lens 2 can simultaneously be observed, the adjusting is facilitated. Furthermore, since the mark 72 is of a circular shape, an image thereof on the monitoring television 13 formed by the light reflected by the mark 72, becomes a dot pattern of an almost circular shape. Accordingly, a total of the dot pattern can easily be entered in a domain for a center-of-gravity calculation, and the center of dot pattern can easily be obtained by the center-of-gravity calculation. Furthermore, as in the preceding Examples, the positioning accuracy is promoted by magnifying the light 52 focused by the lens 2, by the lens in the bundle optical fiber ferrule with lens mark.

EXAMPLE 6

Figure 14A:
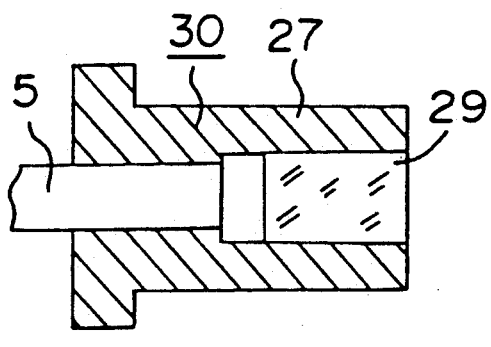
FIGS. 14A and 14B are diagrams for explaining another bundle optical fiber with lens mark.
Figure 14B:
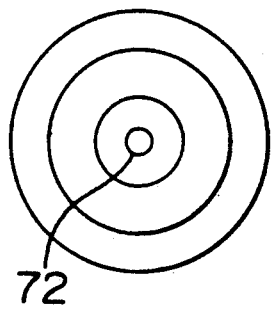
Figure 15:
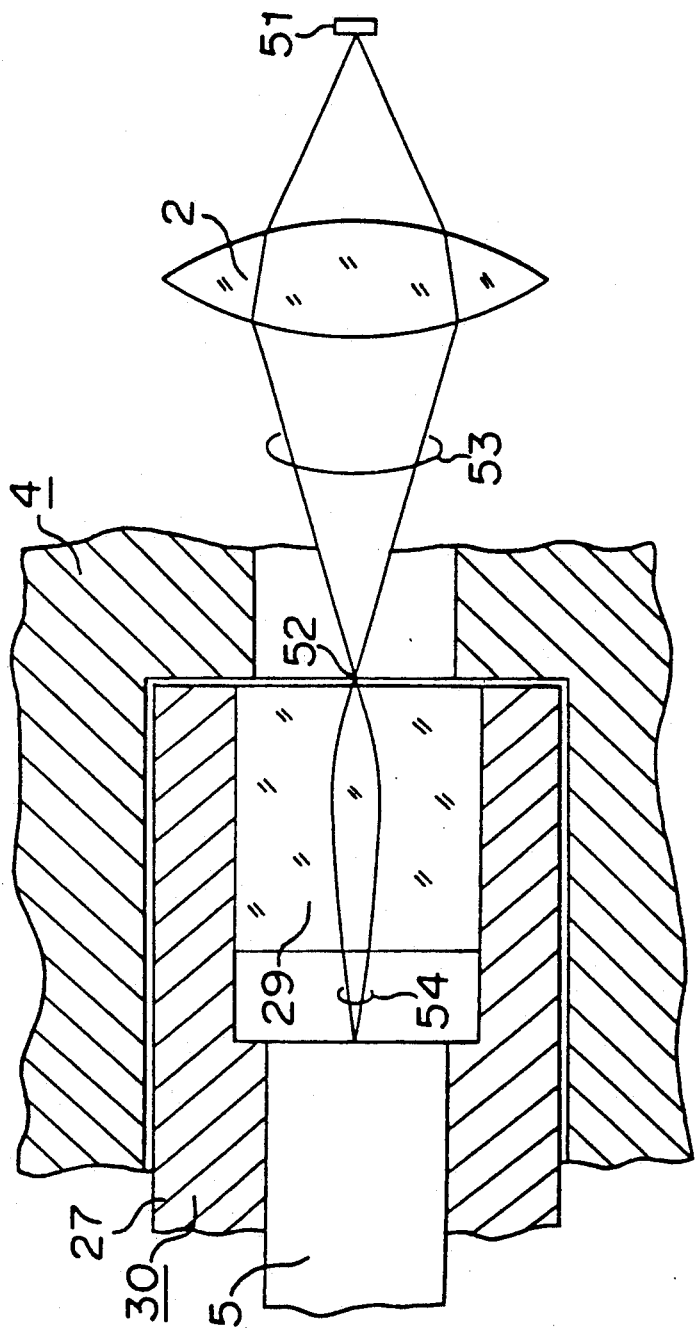
FIG. 15 is a diagram showing an optical path wherein light emitted from a chip of an optical semiconductor element is incident on a bundle optical fiber.
Figure 16:
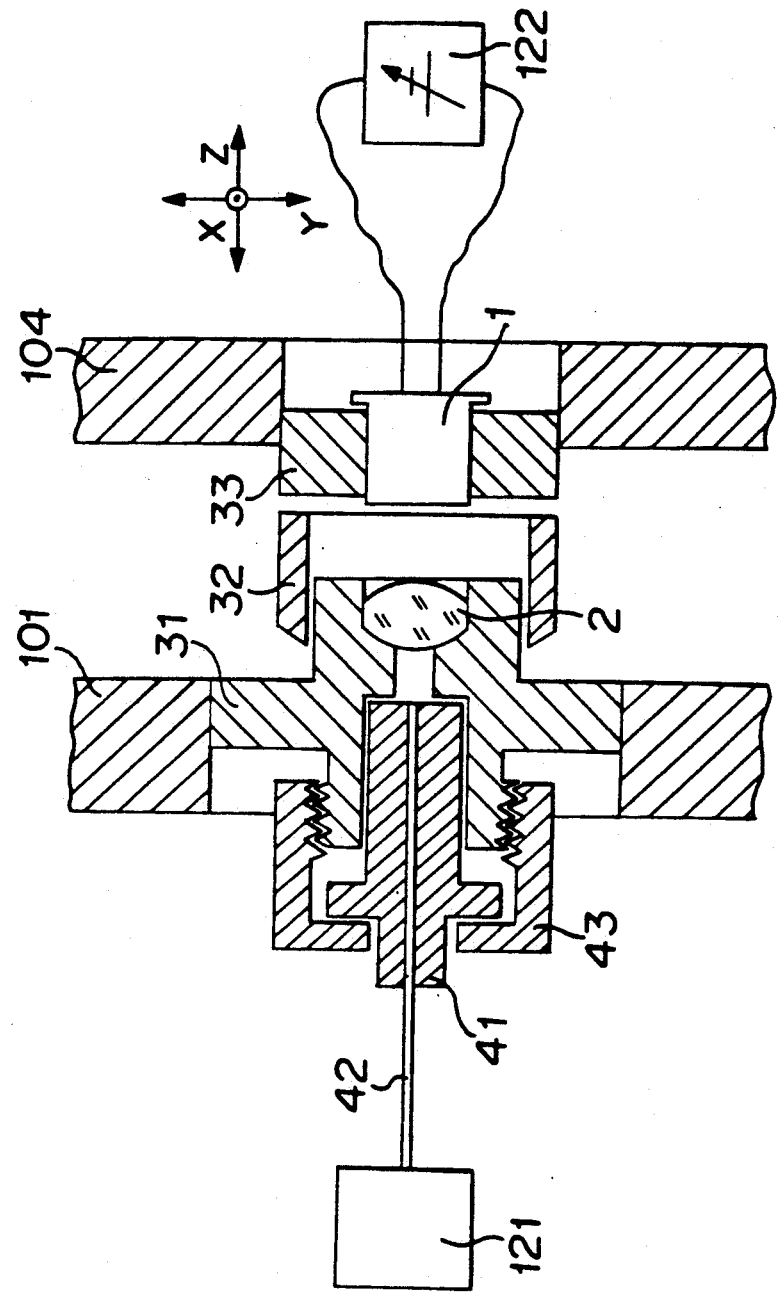
FIG. 16 is a construction diagram showing a conventional method of making an optical semiconductor element module.

In the above Example, the glass plate formed with the mark on one face thereof is fixed to the end portion of the pipe 27. However, an element shown in FIGS. 14A and 14B can be replaced with the bundle optical fiber ferrule with lens mark 28. FIGS. 14A and 14B are diagrams for explaining another bundle optical fiber ferrule with lens mark, and FIG. 15, a diagram for showing an optical path wherein light emitted from a chip of an optical semiconductor element is incident on a bundle optical fiber. In these Figures, a reference numeral 29 is a cylindrical lens of a distributed refraction factor type, which is on sale by Nippon Plate Glass Company under a trademark of "SELFOC". A pitch length of the lens 29 is 0.2 to 0.5 pitch. Furthermore, a mark 72 is formed on one end face of the lens by vapor-deposition of aluminum or the like, and the mark 72 is formed on an end face of the lens 29 opposite to the side of the bundle optical fiber 5. A reference numeral 30 designates a bundle optical fiber ferrule with lens mark wherein the bundle optical fiber 5 and the lens 29 is fixed in the pipe 27. The light 52 emitted from the chip 51 and focused by the lens 2, is again focused by the lens 29 and is incident on the bundle optical fiber 5. A diameter of the light 52 focused by the lens 2, is magnified by 1 to 10 magnification by the lens 29. The mark 72 is formed by an illuminating device in the optical system 12 through the bundle optical fiber 5. A portion of light which illuminates an end face of the lens 29 is reflected by the mark 72 focused on an end face of the bundle optical fiber by the lens 29, and forms a dot pattern of an almost circular shape on an image plane of the monitoring television as in the fifth embodiment.

By replacing the bundle optical fiber ferrule with lens mark 30 with the bundle optical fiber ferrule with lens mark 27 this device can be made by a method similar to that in the fifth embodiment.

EXAMPLE 7

In the first, the third, the fourth and the fifth embodiments, the cases are shown wherein the position of the receptacle 4 in Z-axis direction is controlled. However, the position of the lens 2 may be adjusted.

EXAMPLE 8

In the first, the third, the fourth and the fifth embodiments, the cases are shown wherein the position of the receptacle 4 in Z axis direction is controlled so that the number of cores brightened up by transmitting the focused light 52, is minimized. However, the position of the receptacle 4 in Z-axis direction may be controlled so that the number becomes a predetermined number.

As stated above, according to the present invention, the light emitted by the optical semiconductor element through the bundle optical fiber in the bundle optical fiber ferrule, or the bundle optical fiber ferrule with lens, or the bundle optical fiber ferrule with mark, or by the bundle optical fiber ferrule with lens mark, which is inserted into the receptacle of the optical semiconductor element module, or the light focused from within the optical semiconductor element module, is magnified by the optical system and is observed. Accordingly, it becomes possible to detect the light emitted by the optical semiconductor element or the light focused from within the optical semiconductor element module can be detected as a two-dimensional image. Accordingly, this invention has an effect of shortening the time for adjusting.

I claim:

1. A method of making an optical semiconductor element module comprising the steps of:
   providing a bundle optical fiber which a great number of cores in a ferrule;
   inserting the ferrule incorporating the bundle optical fiber into a receptacle;
   positioning the receptacle so that the bundle optical fiber is optically coupled to an optical semiconductor element;
   observing light emitted from the optical semiconductor element through a plurality of the cores in the bundle optical fiber; and
   adjusting the position of the receptacle relative to the optical semiconductor element, based at least in part on minimizing the plurality of cores through which light is observed.

2. A method as set forth in claim 1 further comprising the step of providing a lens between the optical semiconductor element and the receptacle, said lens converging the light from the optical semiconductor element.

3. A method as set forth in claim 2 further comprising the step of incorporating a second lens within the ferrule, said second lens positioned between the lens and the bundle optical fiber, said second lens converging light received from said lens.

4. The method of claim 1 wherein the step of adjusting comprises the steps of:
   adjusting the position of the receptacle relative to the optical semiconductor element in a first direction to reduce the number of cores through which light is observed resulting in a reduced number of emitting cores; and
   adjusting the position of the receptacle relative to the optical semiconductor element in a second direction which is transverse to the first direction so that a center of light emitted from the reduced number of emitting cores corresponds to the center of the ferrule.

5. The method of claim 4 wherein the step of adjusting in a first direction comprises moving the receptacle so that the bundle optical fiber is moved axially closer to or further from the optical semiconductor element.

6. The method of claim 1 further comprising the steps of providing a light transmissive material with a mark formed thereon so that the mark can be observed during the step of observing light omitted from the optical semiconductor element through a plurality of cores in the bundle optical fiber.

7. The method of claim 6 further comprising the step of providing a lens between the optical semiconductor element and the receptacle, said lens converging the light from the optical semiconductor element.

8. A method of making an optical semiconductor element module comprising the steps of:
 providing a bundles optical fiber with a great number of cores in a ferrule;
 inserting the ferrule into the receptacle, said ferrule including a light transmissive material with a mark formed thereon;
 positioning the receptacle so that the bundle optical fiber is optically coupled to an optical semiconductor element;
 visually observing light emitted from the optical semiconductor element through a number of the cores in the bundle optical fiber;
 visually observing the mark; and
 adjusting the position of the receptacle relative to the optical semiconductor element so that the light observed through the plurality of cores in the bundle optical fiber is centered at the center of the mark.

9. The method of claim 8 wherein the step of adjusting comprising the steps of:
 adjusting the position of the receptacle relative to the optical semiconductor element in a first direction to reduce the number of cores through which light is observed resulting in a reduced number of emitting cores; and
 adjusting the position of the receptacle relative to the optical semiconductor element in a second direction which is transverse to the first direction so that a center of light emitted from the reduced number of emitting cores corresponds to the center from the ferrule.

10. The method of claim 9 wherein the step of adjusting in a first direction comprises moving the receptacle so that the bundle optical fiber is moved axially closer to or further from the optical semiconductor element.

* * * * *